United States Patent
Peng et al.

(10) Patent No.: US 11,598,205 B1
(45) Date of Patent: Mar. 7, 2023

(54) METHOD FOR COMPREHENSIVE EVALUATION OF SHALE FRACABILITY UNDER THE GEOLOGY-ENGINEERING "DOUBLE-TRACK" SYSTEM

(71) Applicant: Southwest Petroleum University, Chengdu (CN)

(72) Inventors: Yu Peng, Chengdu (CN); Ang Luo, Chengdu (CN); Yongming Li, Chengdu (CN); Pengjun Shi, Chengdu (CN); Hu Jia, Chengdu (CN); Cheng Chang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/837,545

(22) Filed: Jun. 10, 2022

(30) Foreign Application Priority Data

Feb. 16, 2022 (CN) .......................... 202210140128.2

(51) Int. Cl.
 E21B 49/00 (2006.01)
 E21B 43/26 (2006.01)
 G01V 99/00 (2009.01)
(52) U.S. Cl.
 CPC ............ *E21B 49/006* (2013.01); *E21B 43/26* (2013.01); *G01V 99/005* (2013.01)
(58) Field of Classification Search
 None
 See application file for complete search history.

(56) References Cited

FOREIGN PATENT DOCUMENTS

| CN | 105822292 | * | 8/2016 | ............. E21B 49/00 |
| CN | 110163533 | A | 8/2019 | |
| CN | 110864966 | A | 3/2020 | |

(Continued)

OTHER PUBLICATIONS

Atefeh Jahandideh, Behnam Jafarpour, Optimization of hydraulic fracturing design under spatially variable shale fracability, Journal of Petroleum Science and Engineering, vol. 138, 2016, pp. 174-188, ISSN 0920-4105, https://doi.org/10.1016/j.petrol.2015.11.032 (Year: 2016).*

(Continued)

*Primary Examiner* — Lina M Cordero
(74) *Attorney, Agent, or Firm* — Nitin Kaushik (57) ABSTRACT

The present invention discloses a method for comprehensive evaluation of shale fracability under the geology-engineering "double-track" system, comprising the following steps: S1: Divide the target horizontal fracturing interval into multiple sampling sections; S2: Establish the reservoir property evaluation factor of each sampling section, and calculate the geological evaluation index of the target horizontal fracturing interval according to the reservoir property evaluation factor of each sampling section; S3: Establish the brittleness factor, natural fracture factor and natural fracture opening factor of each sampling section, and then establish the engineering evaluation index of each sampling section according to these factors; S4: Calculate the engineering evaluation index of the target horizontal fracturing interval according to the engineering evaluation factor of each sampling section; S5: Evaluate the fracability of the target horizontal fracturing interval according to the geological evaluation index and the engineering evaluation index.

7 Claims, 4 Drawing Sheets

(56) References Cited

FOREIGN PATENT DOCUMENTS

| | | |
|---|---|---|
| CN | 112862259 A | 5/2021 |
| CN | 113090258 A | 7/2021 |
| CN | 113283108 A | 8/2021 |

OTHER PUBLICATIONS

Lu C, Ma L, Guo J, et al. Novel method and case study of a deep shale fracability evaluation based on the brittleness index. Energy Exploration & Exploitation. 2022; 40(1):442-459. doi:10.1177/01445987211033656 (Year: 2022).*

* cited by examiner

METHOD FOR COMPREHENSIVE EVALUATION OF SHALE FRACABILITY UNDER THE GEOLOGY-ENGINEERING "DOUBLE-TRACK" SYSTEM

CROSS-REFERENCE TO RELATED APPLICATIONS

The application claims priority to Chinese patent application No. 202210140128.2, filed on Feb. 16, 2022, the entire contents of which are incorporated herein by reference.

TECHNICAL FIELD

The present invention relates to the technical field of oil and gas field development, in particular to a method for comprehensive evaluation of shale fracability under the geology-engineering "double-track" system.

BACKGROUND

As the main method of shale gas development in China, the multi-stage and multi-cluster fracturing of horizontal wells aims to form a fracture network in shale reservoir, which reduces fluid flow resistance and improves the production efficiency and recovery degree of shale gas reservoir. Before the fracturing of shale reservoir, the shale fracability is evaluated according to the abundance of shale gas reserves, rock brittleness, degree of natural fracture development and other factors, which is favorable for avoiding the inefficient and ineffective construction of fracture network fracturing of horizontal wells and reducing the construction loss in the process of reservoir stimulation and has important guiding significance for developing the economical and efficient fracturing construction scheme.

Currently, there are many methods for the evaluation of shale fracability, mainly based on the comprehensive evaluation index of reservoir. However, the current comprehensive evaluation index of fracability ignores the essence of geological and engineering impact factors: geological factors determine the development potential of reservoirs, and engineering factors determine the difficulty of forming fracture network. The comprehensive evaluation index obtained from their simple superposition cannot accurately reflect which fracturing method is more suitable, especially in extreme conditions, such as: (1) the formation with high development potential and great difficulty of forming fracture network (according to the comprehensive evaluation index, the fracability of such formation is moderate, but such reservoir just needs to increase the fracturing scale and free up the shale gas capacity); (2) the formation with low development potential and little difficulty of forming fracture network (the fracability obtained under the same evaluation method is also moderate, but such formation should be abandoned to reduce unnecessary fracturing cost).

SUMMARY

To solve the above problems, the present invention aims to provide a method for comprehensive evaluation of shale fracability under the geology-engineering "double-track" system, considering the synergistic effect of geological and engineering factors, accurately guiding the technical and economic decision making of fracturing construction, and realizing the fine fracability evaluation and efficient but low-cost development of shale reservoir.

The technical solution of the present invention is as follows:

A method for comprehensive evaluation of shale fracability under the geology-engineering "double-track" system, comprising the following steps:

S1: Divide the target horizontal fracturing interval into multiple sampling sections;

S2: Establish the reservoir property evaluation factor of each sampling section, and calculate the geological evaluation index of the target horizontal fracturing interval according to the reservoir property evaluation factor of each sampling section;

S3: Establish the brittleness factor, natural fracture factor and natural fracture opening factor of each sampling section, and then establish the engineering evaluation index of each sampling section according to the brittleness factor, natural fracture factor and natural fracture opening factor of each sampling section;

S4: Calculate the engineering evaluation index of the target horizontal fracturing interval according to the engineering evaluation factor of each sampling section;

S5: Evaluate the fracability of the target horizontal fracturing interval according to the geological evaluation index and the engineering evaluation index.

Preferably, in the S2, the reservoir property evaluation factor is calculated according to the following equations:

$$e_i = a_1 \phi_i' + b_1 \omega_i' \tag{1}$$

$$a_1 + b_1 = 1 \tag{2}$$

$$\phi_i' = \frac{(\phi_{ie} - \phi_{min})}{(\phi_{max} - \phi_{min})} \tag{3}$$

$$\omega_i' = \frac{(\omega_i - \omega_{min})}{(\omega_{max} - \omega_{min})} \tag{4}$$

Where, $e_i$ is the reservoir property evaluation factor of the sampling section i, dimensionless; $a_1$ and $b_1$ are the weight coefficients of physical properties, dimensionless; $\phi_i'$ is the porosity of the sampling section i, dimensionless; $\omega_i'$ is the total organic carbon content of the sampling section i, dimensionless; $\phi_{ie}$ is the effective porosity of the sampling section i, %; $\phi_{max}$ and $\phi_{min}$ are respectively the maximum effective porosity and the minimum effective porosity in all sampling sections, %; $\omega_i$ is the total organic carbon content of the sampling section i, %; $\omega_{max}$ and $\omega_{min}$ are respectively the maximum total organic carbon content and the minimum total organic carbon content in all sampling sections, %.

Preferably, when the effective porosity of the target sampling section is greater than or equal to 4.5%, $a_1$ and $b_1$ are 0.65 and 0.35 respectively; when the effective porosity of the target sampling section is less than 4.5%, $a_1$ and $b_1$ are 0.55 and 0.45 respectively.

Preferably, in the S2, the geological evaluation index is calculated according to the following equation:

$$A = \frac{(\bar{e} - e_{min})}{(e_{max} - e_{min})} \tag{5}$$

Where, A is the geological evaluation index of horizontal fracturing interval, dimensionless; $\bar{e}$ is the average reservoir property evaluation factor for all sampling sections, dimensionless; $e_{max}$ and $e_{min}$ are respectively the maximum and minimum reservoir property evaluation factors in all sampling sections, dimensionless.

Preferably, in the S3, the brittleness factor is calculated according to the following equations:

$$C_i = \lambda\left[1 - \exp\left(\frac{M_i}{E_i}\right)\right] + \frac{\eta(\sigma_{pi} - \sigma_{ci})}{\sigma_{pi}} \quad (6)$$

$$\lambda + \eta = 1 \quad (7)$$

Where, $C_i$ is the brittleness factor of the sampling section i based on the stress-strain curve, dimensionless; $\lambda$ and $\eta$ are the standardized coefficients, dimensionless; $M_i$ is the softening modulus of the sampling section i, in GPa; $E_i$ is the elasticity modulus of the sampling section i, in GPa; $\sigma_{pi}$ is the peak strength obtained from the triaxial compression test at the sampling section i, in MPa; $\sigma_{ci}$ is the participating strength obtained from the triaxial compression test at the sampling section i, in MPa;

The natural fracture factor is calculated according to the following equations:

$$P_{Fi} = \frac{P_{fi} - P_{fmin}}{P_{fmax} - P_{fmin}} \quad (8)$$

$$P_{fi} = \frac{2E_i^2}{(K_{1i}^2 + K_{2i}^2)v_i} \quad (9)$$

$$K_{1i} = 0.3172\rho_i + \frac{0.0457}{V_{ci}} + 0.2131\ln(DT_i) \times 0.5041 \quad (10)$$

$$K_{2i} = 2.1332\rho_i + \frac{0.0768}{V_{ci}} + 1.1886\ln(DT_i) \times 9.1808 \quad (11)$$

Where, $P_{Fi}$ is the natural fracture factor of the sampling section i, dimensionless; $P_{fi}$ is the representation number of natural fracture development degree in sampling section i, ×10⁶ m⁻¹; $P_{fmax}$ and $P_{fmin}$ are respectively the maximum and minimum representation numbers of natural fracture development degree in all sampling sections, ×10⁶ m⁻¹; $K_{1i}$ and $K_{2i}$ are respectively the Type I and Type II fracture toughness of the sampling section i, in MPa·m$^{0.5}$; $v_i$ is the average static Poisson's ratio of the sampling section i, dimensionless; $\rho_i$ is the average shale density of the sampling section i, in g/cm³; $V_{ci}$ is the average mud content of the sampling section i, %; $DT_i$ is the average acoustic time difference of the sampling section i, in μs/m;

The natural fracture opening factor is calculated according to the following equations:

$$P_{Ti} = \frac{P_{tmax} - P_{ti}}{P_{tmax} - P_{tmin}} \quad (12)$$

$$P_{ti} = \sigma_{xi}l_{1i}^2 + \sigma_{yi}l_{2i}^2 + \sigma_{zi}l_{3i}^2 + 2\tau_{xyi}l_{1i}l_{2i} + 2\tau_{yzi}l_{2i}l_{3i} + 2\tau_{zxi}l_{1i}l_{3i} \quad (13)$$

$$l_{1i} = \sqrt{\frac{1 - l_{3i}^2}{1 + \tan^2\theta_i}} \quad (14)$$

$$l_{2i} = l_{1i}\tan\theta_i \quad (15)$$

$$l_{3i} = \cos\alpha_i \quad (16)$$

Where, $P_{Ti}$ is the natural fracture opening factor of the sampling section i, dimensionless; $P_{ti}$ is the fluid pressure when the natural fracture of the sampling section i is opened, in MPa; $P_{tmax}$ and $P_{tmin}$ are respectively the maximum and minimum fluid pressures in all sampling sections to meet the opening of natural fracture, in MPa; $\sigma_{xi}$, $\sigma_{yi}$ and $\sigma_{zi}$ are respectively the normal stress, tangential normal stress and vertical stress of the shaft in the sampling section i, in MPa; $l_{1i}$, $l_{2i}$ and $l_{3i}$ are respectively the cosine values of the included angle between the natural fracture and the maximum horizontal principal stress, minimum horizontal principal stress and vertical stress in the sampling section i, dimensionless; $\tau_{xyi}$, $\tau_{yzi}$ and $\tau_{xzi}$ are respectively the shear stress components of the sampling section i, in MPa; $\theta_i$ is the included angle between the natural fracture and the direction of maximum horizontal principal stress in the sampling section i, °; $\alpha_i$ is the dip angle of natural fracture in the sampling section i, °.

Preferably, in the S3, the engineering evaluation factor is calculated according to the following equation:

$$\frac{3}{f_i} = \frac{1}{C_i} + \frac{1}{P_{Fi}} + \frac{1}{P_{Ti}} \quad (17)$$

Where, $f_i$ is the engineering evaluation factor of the sampling section i, dimensionless; $C_i$ is the brittleness factor of the sampling section i based on the stress-strain curve, dimensionless; $P_{Fi}$ is the natural fracture factor of the sampling section i, dimensionless; $P_{Ti}$ is the natural fracture opening factor of the sampling section i, dimensionless.

Preferably, in the S4, the engineering evaluation index is calculated according to the following equation:

$$B = \frac{(\bar{f} - f_{min})}{(f_{max} - f_{min})} \quad (18)$$

Where, B is the engineering evaluation index of horizontal fracturing interval, dimensionless; $\bar{f}$ is the average engineering evaluation factor for all sampling sections, dimensionless; $f_{max}$ and $f_{min}$ are the maximum and minimum engineering evaluation factors for all sampling sections, dimensionless.

Preferably, in the S5, the fracability of the target horizontal fracturing interval is evaluated according to the geological evaluation index and the engineering evaluation index, specifically as follows:

When the geological evaluation index is within the range of [0,0.1] and the engineering evaluation index is within the range of [0,1.0], the target horizontal fracturing interval is not fracturable;

When the geological evaluation index is within the range of [0.1,1.0) and the engineering evaluation index is within the range of [0,1.0], the target horizontal fracturing interval is fracturable.

Preferably, the present invention further comprises the S6: Establish the fracturing construction scheme for the target horizontal fracturing interval according to the geological evaluation index and the engineering evaluation index.

Preferably, in Step S6, according to the geological evaluation index and engineering evaluation index, the fracturing construction scheme for the target horizontal fracturing interval is established as follows:

When the geological evaluation index is within the range of [0,0.1] and the engineering evaluation index is within the range of [0,1.0], the fracturing construction of the target horizontal fracturing interval will be abandoned;

When the geological evaluation index is within the range of [0.1,0.4] and the engineering evaluation index is within the range of [0,0.7], and when the geological evaluation index is within the range of [0.4,0.7] and the engineering evaluation index is within the range of (0.7,1.0], the slickwater fracturing+fiber temporary plugging and diverting will be carried out for the target horizontal fracturing interval;

When the geological evaluation index is within the range of [0.1,0.4], and the engineering evaluation index is within the range of [0.7,1.0], the slickwater fracturing will be carried out for the target horizontal fracturing interval;

When the geological evaluation index is within the range of [0.4,0.7] and the engineering evaluation index is within the range of [0,0.3], and when the geological evaluation index is within the range of [0.7,1.0] and the engineering evaluation index is within the range of [0.3,0.7], the large-scale fracturing+fiber temporary plugging and diverting+medium multi-clustered volume fracturing will be carried out for the target horizontal fracturing interval;

When the geological evaluation index is within the range of [0.4,0.7] and the engineering evaluation index is within the range of [0.3,0.7], and when the geological evaluation index is within the range of [0.7,1.0] and the engineering evaluation index is within the range of [0.7,1.0], large-scale fracturing+fiber temporary plugging and diverting will be carried out for the target horizontal fracturing interval;

When the geological evaluation index is within the range of [0.7,1.0] and the engineering evaluation index is within the range of [0,0.3], large-scale fracturing+fiber temporary plugging and diverting+highly multi-clustered volume fracturing will be carried out for the target horizontal fracturing interval.

The beneficial effects of the present invention are as follows:

The present invention considers geological factors and engineering factors in parallel, abandons their previous simple superposition, forms an orthogonal construction proposal, and maximizes the production benefit of single well on the premise of avoiding unnecessary construction waste. It overcomes the defects and deficiencies of the prior art, and it is beneficial to realize the development of shale reservoir with lower cost but higher efficiency, with broad market application prospect.

BRIEF DESCRIPTION OF DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the field, other drawings can be obtained based on the structures shown in these drawings without any creative effort.

DETAILED DESCRIPTION OF THE EMBODIMENTS

The present invention is further described with reference to the drawings and embodiments. It should be noted that the embodiments in this application and the technical features in the embodiments can be combined with each other without conflict. It is to be noted that, unless otherwise specified, all technical and scientific terms herein have the same meaning as commonly understood by those of ordinary skill in the field to which this application belongs. "Include" or "comprise" and other similar words used in the present disclosure mean that the components or objects before the word cover the components or objects listed after the word and its equivalents, but do not exclude other components or objects.

Figure 1A:
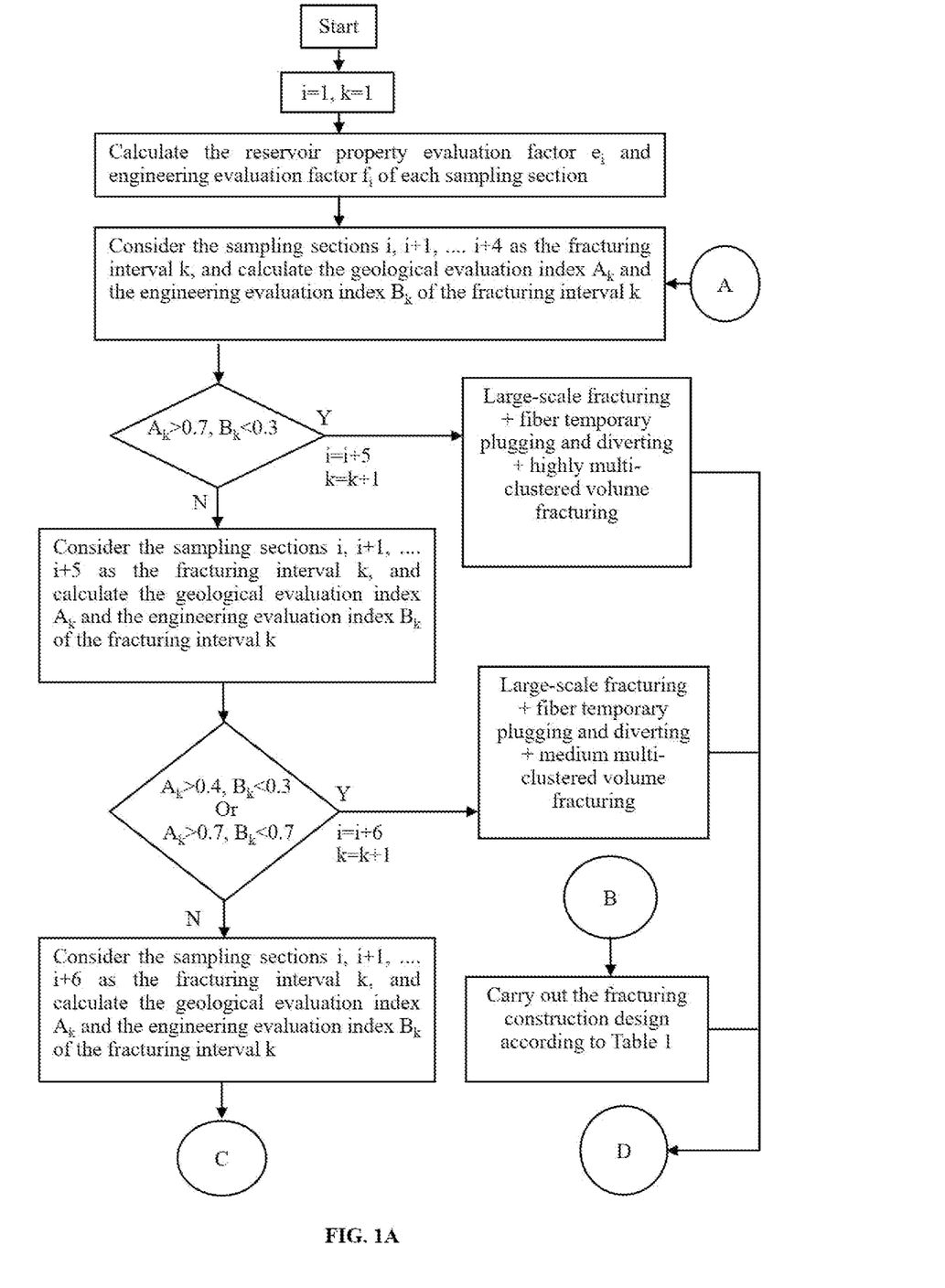
FIG. 1 is the process diagram of dynamic adjustment and optimization of fracturing construction scheme in the present invention.
Figure 1B:
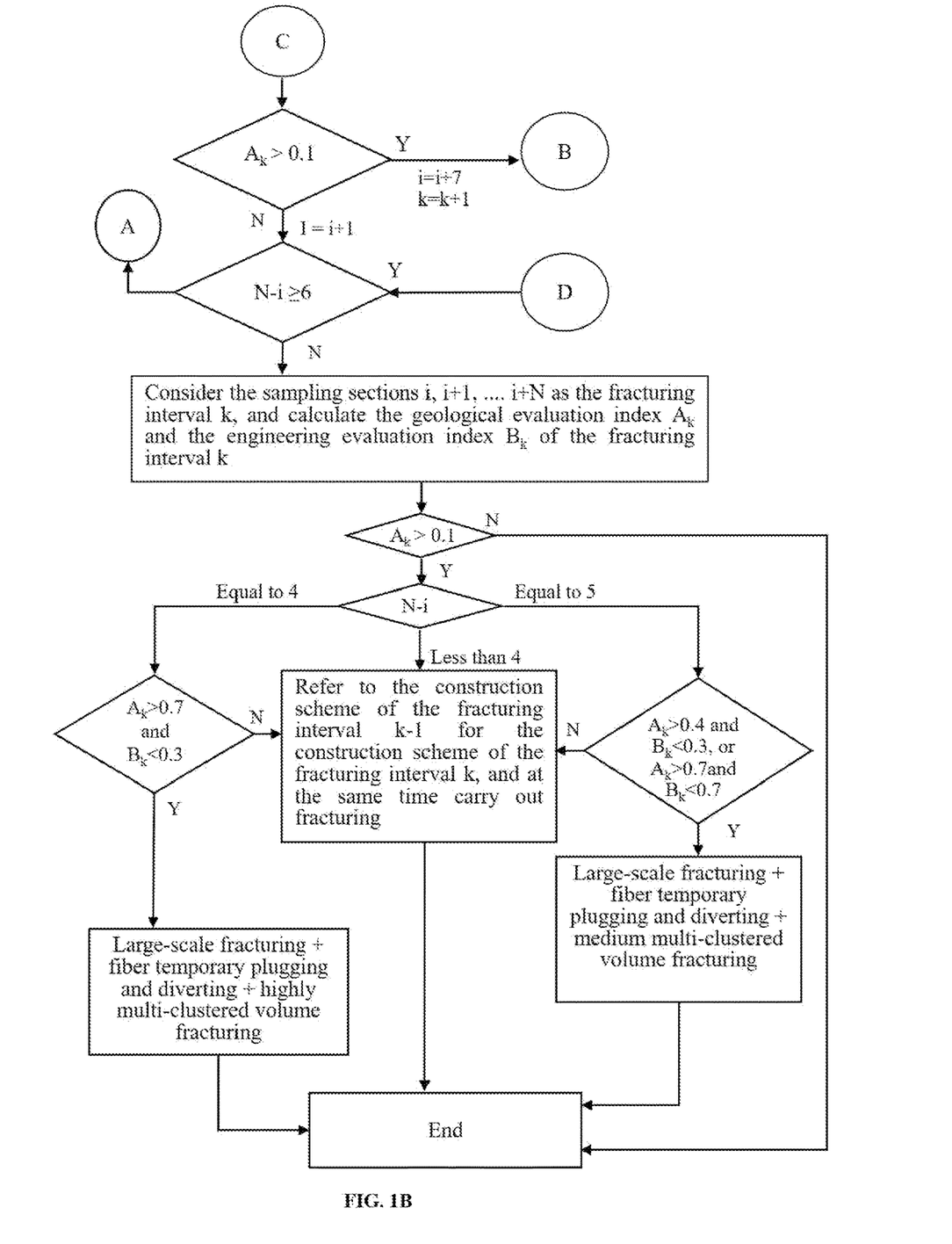

As shown in FIG. 1, the present invention provides a method for comprehensive evaluation of shale fracability under the geology-engineering "double-track" system, comprising the following steps:

S1: Divide the target horizontal fracturing interval into multiple sampling sections.

It should be noted that the target horizontal fracturing interval is divided into multiple sampling sections to mainly reduce the impact of reservoir heterogeneity on the accuracy of evaluation results. If the present invention is used to evaluate the fracability of homogeneous reservoirs, the target horizontal fracturing interval may not be divided into sections. In addition, when the horizontal fracturing interval is divided, the number of sections can be calculated according to the length of the horizontal fracturing interval, and all sampling sections can be numbered from downhole to wellhead. It should be noted that the division by length is only a preferred solution. The target horizontal fracturing interval can be also divided into several sections in the present invention according to other standards, such as the geological parameters of the horizontal fracturing interval.

S2: Establish the reservoir property evaluation factor of each sampling section, and calculate the geological evaluation index of the target horizontal fracturing interval according to the reservoir property evaluation factor of each sampling section.

In a specific embodiment, the reservoir property evaluation factor is calculated according to the following equations:

$$e_i = a_1 \phi_i' + b_1 \omega_i' \tag{1}$$

$$a_1 + b_1 = 1 \tag{2}$$

$$\phi_i' = \frac{(\phi_{ie} - \phi_{min})}{(\phi_{max} - \phi_{min})} \tag{3}$$

$$\omega_i' = \frac{(\omega_i - \omega_{min})}{(\omega_{max} - \omega_{min})} \tag{4}$$

Where, $e_i$ is the reservoir property evaluation factor of the sampling section i, dimensionless; $a_1$ and $b_1$ are the weight coefficients of physical properties, dimensionless; $\phi_i'$ is the porosity of the sampling section i, dimensionless; $\omega_i'$ is the total organic carbon content of the sampling section i, dimensionless; $\phi_{ie}$ is the effective porosity of the sampling section i, %; $\phi_{max}$ and $\phi_{min}$ are respectively the maximum effective porosity and the minimum effective porosity in all sampling sections, %; $\omega_i$ is the total organic carbon content of the sampling section i, %; $\omega_{max}$ and $\omega_{min}$ are respectively the maximum total organic carbon content and the minimum total organic carbon content in all sampling sections, %.

Preferably, when the effective porosity of the target sampling section is greater than or equal to 4.5%, $a_1$ and $b_1$ are 0.65 and 0.35 respectively. When the effective porosity of the target sampling section is less than 4.5%, $a_1$ and $b_1$ are 0.55 and 0.45 respectively. It should be noted that the physical property weight coefficient of the present embodiment is the preferred physical property weight coefficient of the present invention according to the accuracy of the results, etc. In addition to the physical property weight coefficient of the present embodiment, other physical property weight coefficients can be also adopted according to the accuracy and other requirements.

In a specific embodiment, the geological evaluation index is calculated according to the following equation:

$$A = \frac{(\bar{e} - e_{min})}{(e_{max} - e_{min})} \quad (5)$$

Where, A is the geological evaluation index of horizontal fracturing interval, dimensionless; $\bar{e}$ is the average reservoir property evaluation factor for all sampling sections, dimensionless; $e_{max}$ and $e_{min}$ are respectively the maximum and minimum reservoir property evaluation factors in all sampling sections, dimensionless.

S3: Establish the brittleness factor, natural fracture factor and natural fracture opening factor of each sampling section, and then establish the engineering evaluation index of each sampling section according to the brittleness factor, natural fracture factor and natural fracture opening factor of each sampling section.

In a specific embodiment, the brittleness factor is calculated according to the following equations:

$$C_i = \lambda\left[1 - \exp\left(\frac{M_i}{E_i}\right)\right] + \frac{\eta(\sigma_{pi} - \sigma_{ci})}{\sigma_{pi}} \quad (6)$$

$$\lambda + \eta = 1 \quad (7)$$

Where, $C_i$ is the brittleness factor of the sampling section i based on the stress-strain curve, dimensionless; $\lambda$ and $\eta$ are the standardized coefficients, dimensionless; $M_i$ is the softening modulus of the sampling section i, in GPa; $E_i$ is the elasticity modulus of the sampling section i, in GPa; $\sigma_{pi}$ is the peak strength obtained from the triaxial compression test at the sampling section i, in MPa; $\sigma_{ci}$ is the participating strength obtained from the triaxial compression test at the sampling section i, in MPa;

The natural fracture factor is calculated according to the following equations.

$$P_{Fi} = \frac{P_{fi} - P_{f\,min}}{P_{f\,max} - P_{f\,min}} \quad (8)$$

$$P_{fi} = \frac{2E_i^2}{(K_{1i}^2 + K_{2i}^2)v_i} \quad (9)$$

$$K_{1i} = 0.3172\rho_i + \frac{0.0457}{V_{ci}} + 0.2131\ln(DT_i) \times 0.5041 \quad (10)$$

$$K_{2i} = 2.1332\rho_i + \frac{0.0768}{V_{ci}} + 1.1886\ln(DT_i) \times 9.1808 \quad (11)$$

Where, $P_{Fi}$ is the natural fracture factor of the sampling section i, dimensionless; $P_{fi}$ is the representation number of natural fracture development degree in sampling section i, $\times 10^6$ m$^{-1}$; $P_{fmax}$ and $P_{fmin}$ are respectively the maximum and minimum representation numbers of natural fracture development degree in all sampling sections, $\times 10^6$ m$^{-1}$; $K_{1i}$ and $K_{2i}$ are respectively the Type I and Type II fracture toughness of the sampling section i, in MPa·m$^{0.5}$; $v_i$ is the average static Poisson's ratio of the sampling section i, dimensionless; $\rho_i$ is the average shale density of the sampling section i, in g/cm$^3$; $V_{ci}$ is the average mud content of the sampling section i, %; $DT_i$ is the average acoustic time difference of the sampling section i, in μs/m;

The natural fracture opening factor is calculated according to the following equations:

$$P_{Ti} = \frac{P_{t\,max} - P_{ti}}{P_{t\,max} - P_{t\,min}} \quad (12)$$

$$P_{ti} = \sigma_{xi}l_{1i}^2 + \sigma_{yi}l_{2i}^2 + \sigma_{zi}l_{3i}^2 + 2\tau_{xyi}l_{1i}l_{2i} + 2\tau_{yzi}l_{2i}l_{3i} + 2\tau_{zxi}l_{1i}l_{3i} \quad (13)$$

$$l_{1i} = \sqrt{\frac{1 - l_{3i}^2}{1 + \tan^2\theta_i}} \quad (14)$$

$$l_{2i} = l_{1i}\tan\theta_i \quad (15)$$

$$l_{3i} = \cos\alpha_i \quad (16)$$

Where, $P_{Ti}$ is the natural fracture opening factor of the sampling section i, dimensionless; $P_{ti}$ is the fluid pressure when the natural fracture of the sampling section i is opened, in MPa; $P_{tmax}$ and $P_{tmin}$ are respectively the maximum and minimum fluid pressures in all sampling sections to meet the opening of natural fracture, in MPa; $\sigma_{xi}$, $\sigma_{yi}$ and $\sigma_{zi}$ are respectively the normal stress, tangential normal stress and vertical stress of the shaft in the sampling section i, in MPa; $l_{1i}$, $l_{2i}$ and $l_{3i}$ are respectively the cosine values of the included angle between the natural fracture and the maximum horizontal principal stress, minimum horizontal principal stress and vertical stress in the sampling section i, dimensionless; $\tau_{xyi}$, $\tau_{yzi}$ and $\tau_{xzi}$ are respectively the shear stress components of the sampling section i, in MPa; $\theta_i$ is the included angle between the natural fracture and the direction of maximum horizontal principal stress in the sampling section i, °; $\alpha_1$ is the dip angle of natural fracture in the sampling section i, °.

The engineering evaluation factor is calculated according to the following equation:

$$\frac{3}{f} = \frac{1}{C_i} + \frac{1}{P_{Fi}} + \frac{1}{P_{Ti}} \quad (17)$$

Where, $f_i$ is the engineering evaluation factor of the sampling section i, dimensionless.

It should be noted that the brittleness factor, natural fracture factor and natural fracture opening factor in Equation (17) of the present invention can be calculated by other calculation methods in the prior art in addition to the calculation equations shown in Equations (6)-(16).

S4: Calculate the engineering evaluation index of the target horizontal fracturing interval according to the engineering evaluation factor of each sampling section.

In a specific embodiment, the engineering evaluation index is calculated according to the following equation:

$$B = \frac{(\bar{f} - f_{min})}{(f_{max} - f_{min})} \quad (18)$$

Where, B is the engineering evaluation index of horizontal fracturing interval, dimensionless; $\bar{f}$ is the average engineering evaluation factor for all sampling sections, dimensionless; $f_{max}$ and $f_{min}$ are the maximum and minimum engineering evaluation factors for all sampling sections, dimensionless.

S5: Evaluate the fracability of the target horizontal fracturing interval according to the geological evaluation index and the engineering evaluation index, specifically as follows:

When the geological evaluation index is within the range of [0,0.1] and the engineering evaluation index is within the range of [0,1.0], the target horizontal fracturing interval is not fracturable.

When the geological evaluation index is within the range of [0.1,1.0) and the engineering evaluation index is within the range of [0,1.0], the target horizontal fracturing interval is fracturable.

In a specific embodiment, the method for comprehensive evaluation of shale fracability under the geology-engineering "double-track" system in the present invention further comprises the S6: Establish the fracturing construction scheme for the target horizontal fracturing interval according to the geological evaluation index and the engineering evaluation index. The specific fracturing construction scheme is shown in Table 1:

TABLE 1

Fracturing construction scheme for target horizontal fracturing interval under different geological evaluation indexes and engineering evaluation indexes

| Geological evaluation index A | Engineering evaluation index B | | |
|---|---|---|---|
| | [0, 0.3] | (0.3, 0.7] | (0.7, 1.0] |
| [0, 0.1] | | Abandoned | |
| (0.1, 0.4] | Slickwater fracturing + fiber temporary plugging and diverting | Slickwater fracturing + fiber temporary plugging and diverting | Slickwater fracturing |
| (0.4, 0.7] | Large-scale fracturing + fiber temporary plugging and diverting + medium multi-clustered volume fracturing | Large-scale fracturing + fiber temporary plugging and diverting | Slickwater fracturing + fiber temporary plugging and diverting |
| (0.7, 1.0] | Large-scale fracturing + fiber temporary plugging and diverting + highly multi-clustered volume fracturing | Large-scale fracturing + fiber temporary plugging and diverting + medium multi-clustered volume fracturing | Large-scale fracturing + fiber temporary plugging and diverting |

In a specific embodiment, in Table 1, the slickwater formula for slickwater fracturing is 0.2% effective drag reducer FJZ-2+0.5% polymer emulsion viscofier FZN-1+0.25% anti-water lock surfactant FSSJ-8+100 KCl, the construction displacement is 16-18 m³/min, and the liquid intensity is 28-30 m³/m. The specific displacement and consumption are calculated according to the pumping equipment and the construction length of the horizontal interval (the calculation method is the prior art and will not be described here). It should be noted that slickwater fracturing technology is a prior art. In addition to the slickwater formula used in this embodiment, other slickwater formulas in the prior art can be also used depending on the formation conditions of the target well.

The large-scale fracturing means that the liquid intensity for fracturing is 150% of that for slickwater fracturing, and the other parameters are the same as those for slickwater fracturing. The fiber temporary plugging and diverting means that the fiber is added when the slickwater pumping pressure is stable until the pumping pressure is increased by 6-10 MPa; the fiber length is 5.00-6.00 mm, the fiber concentration is 0.5-1.8%, the fiber consumption is calculated according to the on-site construction conditions (the calculation method is the prior art, which will not be described here). The cluster spacing corresponding to the medium multi-clustered volume fracturing and the highly multi-clustered volume fracturing is 12 m and 10 m, and the perforating density is 4 shots/cluster and 6 shots/cluster respectively. For other fracturing construction schemes, the cluster spacing is 14 m, and the perforating density is 4 shots/cluster. The perforating depth is 0.2 m, and the number of clusters is calculated according to the length of the fracturing interval (the calculation method is the prior art, which will not be described here).

Two adjacent horizontal wells X and Y in shale gas reservoir in southern Sichuan are taken as examples to verify the accuracy of the method for comprehensive evaluation of shale fracability under the geology-engineering "double-track" system in the present invention. The horizontal interval length of Well X and Well Y are 1,080 m and 1,260 m respectively. The geological exploration results show that the shale gas reserves in the reservoir where the two horizontal intervals are located are high, but the brittleness index is poor. According to the horizontal well development experience in this area, Well X and Well Y are subject to stimulation by staged and clustered fracturing in a horizontal well with a section length of 60 m, and the number of sections is 18 and 21 respectively. The cluster spacing is 12 m, the number of clusters is 5; the perforating density is 4 shots/cluster, and the perforating depth is 0.2 m; the slickwater pumping displacement is 16 m³/min, the average amount of liquid used per section is 1,800 m³, and the total amount is 3.24×10⁴ m³ and 3.78×10⁴ m³ respectively.

The present invention is adopted for the fracability evaluation of Well X, specifically as follows:

(1) Divide the horizontal interval from toe end to heel end every 10 m and number it;

(2) According to the core laboratory evaluation experiment data, count the total organic carbon content, porosity and effective porosity of each sampling section, and obtain the reservoir property evaluation factor of each sampling section based on the Equations (1)-(4);

(3) Obtain the geological evaluation index of each target fracturing interval of Well X based on the Equation (5) according to the reservoir property evaluation factor of each sampling section;

(4) Obtain other basic data of each sampling section by analyzing the mineral composition, sorting out the logging data, measuring the core mechanical parameters, establishing the numerical model and through data fitting and regression, etc. Obtain the brittleness factor, natural fracture factor and natural fracture opening factor of each sampling section based on the Equations (6)-(16);

(5) Obtain the engineering evaluation index of each target fracturing interval based on the Equation (17) according to the brittleness factor, the natural fracture factor and the natural fracture opening factor of each sampling section;

(6) According to the geological evaluation index obtained from Step (3) and the engineering evaluation index obtained from Step (5), carry out the dynamic adjustment and optimization of fracturing construction scheme for Well X in combination with FIG. 1, with the results shown in Table 2.

It should be noted that, in Step (6), the dynamic adjustment and optimization method shown in FIG. 1 is taken for the staged fracturing of target fracturing interval so as to improve the final fracturing effect. In use, it can be also staged directly according to the section length as required, and then according to the geological evaluation index and engineering evaluation index results of each section, the fracturing construction scheme of each section can be formulated in combination with Table 1.

ing density is 6 shots/cluster. The cluster spacing of other sections is 14 m, and the perforating density is 4 shots/cluster. The perforating depth is 0.2 m.

Figure 2:
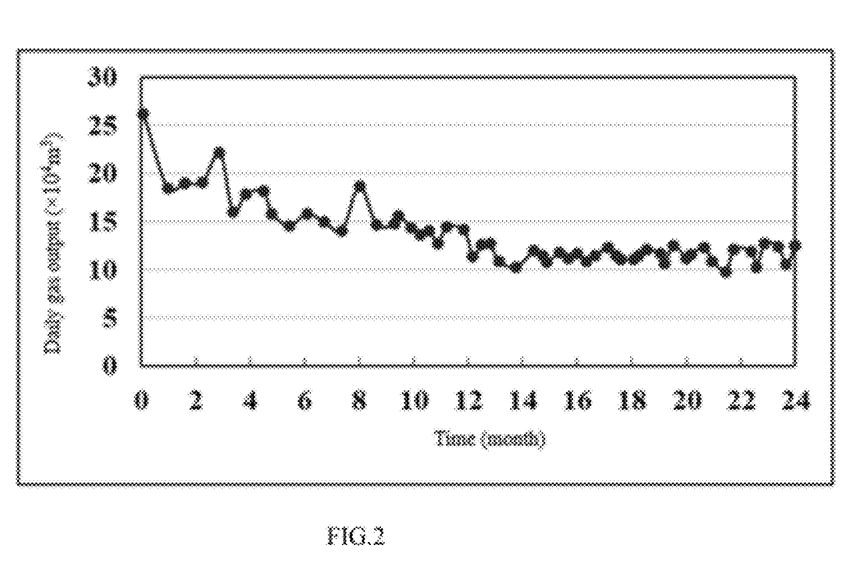
FIG. 2 is the production curve diagram of Well X in the present invention after fracturing in an embodiment.

According to the fracturing construction scheme suggested in Table 2, the production curve of Well X after fracturing is obtained, with results shown in FIG. 2. Seen from FIG. 2, the maximum daily gas output of Well X is $26.1 \times 10^4$ $m^3$ at the initial stage of construction, and the average daily gas output is $15.1 \times 10^4$ $m^3$ in the first year and $11.5 \times 10^4$ $m^3$ in the second year.

Figure 3:
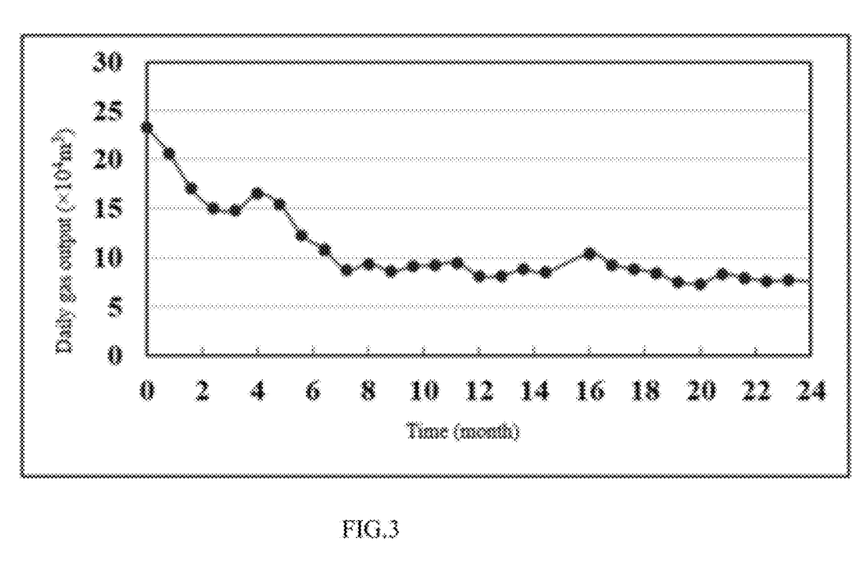
FIG. 3 is the production curve diagram of Well Y in the contrastive example after fracturing in an embodiment.

For Well Y adjacent to Well X, the original fracturing design scheme (the above fracturing scheme formulated depending on the experience of horizontal well development) is adopted for fracturing construction, and the production curve of Well Y after fracturing is obtained, with results shown in FIG. 3. On the one hand, the real-time detection of microseism shows that if compared with Well X, the distribution of fracture network in Well Y reservoir is poor and the oil and gas reservoir body is not effectively communicated. On the other hand, it can be seen from FIG. 3 that the maximum daily gas output in Well Y is $23.3 \times 10^4$ $m^3$, and the average daily gas output is $13.1 \times 10^4$ $m^3$ in the

TABLE 2

Suggestions for fracturing construction scheme of Well X

| Section No. k | Measured depth m | Section length m | Geological evaluation index $A_k$ | Engineering evaluation index $B_k$ | Fracturing construction scheme |
|---|---|---|---|---|---|
| 1 | 5420-5490 | 70 | 0.605 | 0.470 | Large-scale fracturing + fiber temporary plugging and diverting |
| 2 | 5360-5420 | 60 | 0.415 | 0.263 | Large-scale fracturing + fiber temporary plugging and diverting + medium multi-clustered volume fracturing |
| 3 | 5290-5360 | 70 | 0.217 | 0.294 | Slickwater fracturing + fiber temporary plugging and diverting |
| 4 | 5240-5290 | 50 | 0.809 | 0.281 | Large-scale fracturing + fiber temporary plugging and diverting + highly multi-clustered volume fracturing |
| 5 | 5160-5230 | 70 | 0.391 | 0.439 | Slickwater fracturing + fiber temporary plugging and diverting |
| 6 | 5090-5160 | 70 | 0.582 | 0.596 | Large-scale fracturing + fiber temporary plugging and diverting |
| 7 | 5030-5090 | 60 | 0.805 | 0.372 | Large-scale fracturing + fiber temporary plugging and diverting + medium multi-clustered volume fracturing |
| 8 | 4980-5030 | 50 | 0.759 | 0.225 | Large-scale fracturing + fiber temporary plugging and diverting + highly multi-clustered volume fracturing |
| 9 | 4930-4980 | 50 | 0.795 | 0.219 | Large-scale fracturing + fiber temporary plugging and diverting + highly multi-clustered volume fracturing |
| 10 | 4860-4920 | 60 | 0.731 | 0.554 | Large-scale fracturing + fiber temporary plugging and diverting + medium multi-clustered volume fracturing |
| 11 | 4790-4860 | 70 | 0.532 | 0.387 | Large-scale fracturing + fiber temporary plugging and diverting |
| 12 | 4720-4790 | 70 | 0.388 | 0.405 | Slickwater fracturing + fiber temporary plugging and diverting |
| 13 | 4640-4710 | 70 | 0.583 | 0.701 | Slickwater fracturing + fiber temporary plugging and diverting |
| 14 | 4580-4640 | 60 | 0.706 | 0.644 | Large-scale fracturing + fiber temporary plugging and diverting + medium multi-clustered volume fracturing |
| 15 | 4510-4580 | 70 | 0.643 | 0.476 | Large-scale fracturing + fiber temporary plugging and diverting |
| 16 | 4460-4510 | 50 | 0.793 | 0.256 | Large-scale fracturing + fiber temporary plugging and diverting + highly multi-clustered volume fracturing |

In Table 2, the construction amount of slickwater for slickwater fracturing is 31,200 $m^3$, the pumping displacement is 16 $m^3$/min, and the total amount of slickwater is $3.12 \times 10^4$ $m^3$. The fiber concentration for fiber temporary plugging and diverting is 1%, the fiber length is 6 mm, and the fiber dosage is 7 t. The cluster spacing for medium multi-clustered volume fracturing is 12 m, and the perforating density is 4 shots/cluster. The cluster spacing for highly multi-clustered volume fracturing is 10 m, and the perforatfirst year and $8.2 \times 10^4$ $m^3$ in the second year. Therefore, the fracturing construction scheme of shale reservoir, which is put forward through parallel consideration of geological factors and engineering factors in the present invention, is more reasonable. It can effectively optimize the distribution of reservoir fracture network, increase the effective cover area of fracture network, and stably improve the production capacity of single well for a long time. It has a certain guiding significance for the efficient and low-cost development of shale reservoirs. If compared with the prior art, the present invention has significant progress.

The above are not intended to limit the present invention in any form. Although the present invention has been disclosed as above with embodiments, it is not intended to limit the present invention. Those skilled in the field, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A method for evaluation of shale fracability under geology-engineering "double-track" system, comprising the following steps:

S1: Divide a target horizontal fracturing interval into multiple sampling sections;

S2: Establish a reservoir property evaluation factor of each sampling section, and calculate a geological evaluation index of the target horizontal fracturing interval according to the reservoir property evaluation factor of each sampling section;

S3: Establish a brittleness factor, a natural fracture factor and a natural fracture opening factor of each sampling section, and then establish an engineering evaluation index of each sampling section according to the brittleness factor, the natural fracture factor and the natural fracture opening factor of each sampling section;

The brittleness factor is calculated according to the following equations:

$$C_i = \lambda \left[1 - \exp\left(\frac{M_i}{E_i}\right)\right] + \frac{\eta(\sigma_{pi} - \sigma_{ci})}{\sigma_{pi}}$$

$$\lambda + \eta = 1$$

Where, $C_i$ is the brittleness factor of the sampling section i based on a stress-strain curve, dimensionless; $\lambda$ and $\eta$ are standardized coefficients, dimensionless; $M_i$ is a softening modulus of the sampling section i, in gigapascals (Gpa); $E_i$ is an elasticity modulus of the sampling section i, in GPa; $\sigma_{pi}$ is a peak strength obtained from a triaxial compression test at the sampling section i, in megapascals (Mpa); $\sigma_{ci}$ is a participating strength obtained from the triaxial compression test at the sampling section i, in MPa;

The natural fracture factor is calculated according to the following equations:

$$P_{Fi} = \frac{P_{fi} - P_{fmin}}{P_{fmax} - P_{fmin}}$$

$$P_{fi} = \frac{2E^2}{\left(K_{1i}^2 + K_{2i}^2\right)v_i}$$

$$K_{1i} = 0.3172\rho_i + \frac{0.0457}{V_{ci}} + 0.2131\ln(DT_i) \times 0.5041$$

$$K_{2i} = 2.1332\rho_i + \frac{0.0768}{V_{ci}} + 1.1886\ln(DT_i) \times 9.1808$$

Where, $P_{Fi}$ is the natural fracture factor of the sampling section i, dimensionless; $P_{fi}$ is a representation number of natural fracture development degree in sampling section i, $\times 10^6$ m$^{-1}$; $P_{fmax}$ and $P_{fmin}$ are respectively maximum and minimum representation numbers of natural fracture development degree in all sampling sections, $\times 10^6$ m$^{-1}$; $K_{1i}$ and $K_{2i}$ are respectively Type I and Type II fracture toughness of the sampling section i, in MPa·m$^{0.5}$; $v_i$ is an average static Poisson's ratio of the sampling section i, dimensionless; $\rho_i$ is an average shale density of the sampling section i, in g/cm$^3$; $V_{ci}$ is an average mud content of the sampling section i, in percentage (%); $DT_i$ is an average acoustic time difference of the sampling section i, in μs/m;

The natural fracture opening factor is calculated according to the following equations:

$$P_{Ti} = \frac{P_{t\,max} - P_{ti}}{P_{t\,max} - P_{t\,min}} \tag{12}$$

$$P_{ti} = \sigma_{xi}l_{1i}^2 + \sigma_{yi}l_{2i}^2 + \sigma_{zi}l_{3i}^2 + 2\tau_{xyi}l_{1i}l_{2i} + 2\tau_{yzi}l_{2i}l_{3i} + 2\tau_{zxi}l_{1i}l_{3i}$$

$$l_{1i} = \sqrt{\frac{1 - l_{3i}^2}{1 + \tan^2\theta_i}}$$

$$l_{2i} = l_{1i}\tan\theta_i$$

$$l_{3i} = \cos\alpha_i$$

Where, $P_{Ti}$ is the natural fracture opening factor of the sampling section i, dimensionless; $P_{ti}$ is a fluid pressure when a natural fracture of the sampling section i is opened, in MPa; $P_{tmax}$ and $P_{tmin}$ are respectively maximum and minimum fluid pressures in all sampling sections to meet the opening of the natural fracture, in MPa; $\sigma_{xi}$, $\sigma_{yi}$ and $\sigma_{zi}$ are respectively normal stress, tangential normal stress and vertical stress of a shaft in the sampling section i, in MPa; $l_{1i}$, $l_{2i}$ and $l_{3i}$ are respectively cosine values of an included angle between the natural fracture and maximum horizontal principal stress, minimum horizontal principal stress and vertical stress in the sampling section i, dimensionless; $\tau_{xyi}$, $\tau_{yzi}$ and $\tau_{xzi}$ are respectively shear stress components of the sampling section i, in MPa; $\theta_i$ is the included angle between the natural fracture and the maximum horizontal principal stress, the minimum horizontal principal stress and the vertical stress in the sampling section i, in degrees (°); $\alpha_1$ is a dip angle of the natural fracture in the sampling section i, in degrees (°);

S4: Calculate an engineering evaluation index of the target horizontal fracturing interval according to the engineering evaluation index of each sampling section;

S5: Evaluate the shale fracability of the target horizontal fracturing interval according to the geological evaluation index and the engineering evaluation index;

S6: Establish a fracturing construction scheme for the target horizontal fracturing interval according to the geological evaluation index and the engineering evaluation index;

wherein, in step S6, the fracturing construction scheme for the target horizontal fracturing interval is established according to the geological evaluation index and the engineering evaluation index, specifically as follows:

when the geological evaluation index is within a range of [0,0.1] and the engineering evaluation index is within a range of [0,1.0], fracturing construction of the target horizontal fracturing interval will be abandoned when the geological evaluation index is within a range of [0.1,0.4] and the engineering evaluation index is within a range of [0,0.7], and when the geological evaluation index is within a range of [0.4,0.7] and the engineering evaluation index is within a range of [0.7,1.0], slickwater fracturing+fiber temporary plugging and diverting will be carried out for the target horizontal fracturing interval when the geological evaluation index is within the range of [0.1,0.4], and the engineering evaluation index is within the range of [0.7,1.0], slickwater fracturing will be carried out for the target horizontal fracturing interval;

when the geological evaluation index is within the range of [0.4,0.7] and the engineering evaluation index is within a range of [0,0.3], and when the geological evaluation index is within a range of [0.7,1.0] and the engineering evaluation index is within a range of [0.3,0.7], large-scale fracturing+fiber temporary plugging and diverting+medium multi-clustered volume fracturing will be carried out for the target horizontal fracturing interval, the large-scale fracturing means that liquid intensity for fracturing is 150% of that for the slickwater fracturing when the geological evaluation index is within the range of [0.4,0.7] and the engineering evaluation index is within the range of [0.3,0.7], and when the geological evaluation index is within the range of [0.7,1.0] and the engineering evaluation index is within the range of [0.7,1.0], large-scale fracturing+fiber temporary plugging and diverting will be carried out for the target horizontal fracturing interval;

when the geological evaluation index is within the range of [0.7,1.0] and the engineering evaluation index is within the range of [0,0.3], large-scale fracturing+fiber temporary plugging and diverting+multi-clustered volume fracturing will be carried out for the target horizontal fracturing interval.

2. The method for evaluation of the shale fracability under the geology-engineering "double-track" system according to claim 1, wherein, in step S2, the reservoir property evaluation factor is calculated according to the following equations:

$$e_i = a_1 \varphi_i' + b_1 \omega_i'$$

$$a_1 + b_1 = 1$$

$$\varphi_i' = \frac{(\varphi_{ie} - \varphi_{min})}{(\varphi_{max} - \varphi_{min})}$$

$$\omega_i' = \frac{(\omega_i - \omega_{min})}{(\omega_{max} - \omega_{min})}$$

Where, $e_i$ is the reservoir property evaluation factor of the sampling section i, dimensionless; $a_1$ and $b_1$ are weight coefficients of physical properties, dimensionless; $\phi_i'$ is a porosity of the sampling section i, dimensionless; $\omega_i'$ is a total organic carbon content of the sampling section i, dimensionless; $\phi_{ie}$ is an effective porosity of the sampling section i, in %; $\phi_{max}$ and $\phi_{min}$ are respectively maximum effective porosity and minimum effective porosity in all sampling sections, in %; $\omega_i$ is a total organic carbon content of the sampling section i, in %; $\omega_{max}$ and $\omega_{min}$ are respectively maximum total organic carbon content and minimum total organic carbon content in all sampling sections, in %.

3. The method for the evaluation of the shale fracability under the geology-engineering "double-track" system according to claim 2, wherein when the effective porosity of the sampling section is greater than or equal to 4.5%, $a_1$ and $b_1$ are 0.65 and 0.35 respectively; and when the effective porosity of the sampling section is less than 4.5%, $a_1$ and $b_1$ are 0.55 and 0.45 respectively.

4. The method for the evaluation of the shale fracability under the geology-engineering "double-track" system according to claim 2, wherein, in step S2, the geological evaluation index is calculated according to the following equation:

$$A = \frac{(\bar{e} - e_{min})}{(e_{max} - e_{min})}$$

Where, A is the geological evaluation index of the target horizontal fracturing interval, dimensionless; $\bar{e}$ is an average reservoir property evaluation factor for all sampling sections, dimensionless; $e_{max}$ and $e_{min}$ are respectively maximum and minimum reservoir property evaluation factors in all sampling sections, dimensionless.

5. The method for the evaluation of the shale fracability under the geology-engineering "double-track" system according to claim 1, wherein, in step S3, the engineering evaluation index is calculated according to the following equation:

$$\frac{3}{f_i} = \frac{1}{C_i} + \frac{1}{P_{Fi}} + \frac{1}{P_{Ti}}$$

Where, $f_i$ is the engineering evaluation index of the sampling section i, dimensionless; $C_i$ is the brittleness factor of the sampling section i based on the stress-strain curve, dimensionless; $P_{Fi}$ is the natural fracture factor of the sampling section i, dimensionless; $P_{Ti}$ is the natural fracture opening factor of the sampling section i, dimensionless.

6. The method for the evaluation of the shale fracability under the geology-engineering "double-track" system according to claim 5, wherein, in step S4, the engineering evaluation index is calculated according to the following equation:

$$B = \frac{(\bar{f} - f_{min})}{(f_{max} - f_{min})}$$

Where, B is the engineering evaluation index of the target horizontal fracturing interval, dimensionless; $\bar{f}$ is an average engineering evaluation factor for all sampling sections, dimensionless; $f_{max}$ and $f_{min}$ are maximum and minimum engineering evaluation factors for all sampling sections, dimensionless.

7. The method for the evaluation of the shale fracability under the geology-engineering "double-track" system according to claim 1, wherein, in step S5, the shale fracability of the target horizontal fracturing interval is evaluated according to the geological evaluation index and the engineering evaluation index, specifically as follows:

When the geological evaluation index is within the range of [0,0.1] and the engineering evaluation index is within the range of [0,1.0], the target horizontal fracturing interval is not fracturable; When the geological evaluation index is within a range of [0.1,1.0] and the engineering evaluation index is within the range of [0,1.0], the target horizontal fracturing interval is fracturable.

* * * * *